(12) United States Patent
Prince et al.

(10) Patent No.: US 6,660,086 B1
(45) Date of Patent: Dec. 9, 2003

(54) METHOD AND APPARATUS FOR EXTRUDING A COATING UPON A SUBSTRATE SURFACE

(75) Inventors: Kendall W. Prince, Layton, UT (US); Gordon L. King, Mesa, AZ (US); Roderick Hughes, Newport Beach, CA (US); Richard B. Flora, Wabash, IN (US)

(73) Assignee: Innovative Coatings, Inc., Mesa, AZ (US)

( * ) Notice: Subject to any disclaimer, the term of this patent is extended or adjusted under 35 U.S.C. 154(b) by 0 days.

(21) Appl. No.: 09/518,870

(22) Filed: Mar. 6, 2000

(51) Int. Cl.⁷ .............................................. B05C 11/02
(52) U.S. Cl. ............................ 118/125; 118/44; 118/72
(58) Field of Search .......................... 118/410, 72, 411, 118/44, 125, 73, 412, 66, 122, 67, 69, 121, 62, 205, 109, 123, DIG. 18, 413, 419, 420, 404, 405, 206, DIG. 11, DIG. 12; 425/466, 113, 465

(56) References Cited

U.S. PATENT DOCUMENTS

| | | | |
|---|---|---|---|
| 2,386,818 A | 10/1945 | Seavey | |
| 2,779,970 A | 2/1957 | Stocker | |
| 2,820,249 A | 1/1958 | Colombo | |
| 2,926,729 A | 3/1960 | Zanini | |
| 3,060,889 A | 10/1962 | Knapp | |
| 3,076,234 A | 2/1963 | Paulus | |
| 3,110,625 A | 11/1963 | Bettner | |
| 3,189,514 A | 6/1965 | Shriver et al. | |
| 3,216,068 A | 11/1965 | Williams | |
| 3,432,885 A | 3/1969 | Zanini | |
| 3,568,640 A | 3/1971 | Kuettner | 118/405 |
| 3,590,431 A | 7/1971 | Miller | 18/13 |
| 3,595,203 A | 7/1971 | Fabulich | 118/2 |

(List continued on next page.)

FOREIGN PATENT DOCUMENTS

| | | | |
|---|---|---|---|
| DE | 25 03 354 | 1/1975 | |
| EP | 201 097 | 12/1986 | ............... 71/2 |
| EP | 0 210 297 | 2/1987 | |
| JP | 7117094 A | 5/1995 | ............. 6/14.2 |
| TW | 341533 | 10/1998 | |

OTHER PUBLICATIONS

The Condensed Chemical Dictionary, Tenth Edition Van Nostrand Reinhold Company (New York), pp 2, 90, 1981.*

*Primary Examiner*—Brenda A. Lamb
(74) *Attorney, Agent, or Firm*—Kirton & McConkie; Berne S. Broadbent

(57) ABSTRACT

A coating apparatus and method are disclosed that applies a coating to a product in a uniform and controlled manner. The coating apparatus comprises a feeding stage, an optional pre-treatment stage, at least one coating stage and a finishing stage. The coating stage(s) comprise a coating material feeder and a coating device. The coating device includes an aperture conforming to the perimeter of a substrate to be coated in a first and second dimension. As the substrate passes through the aperture, coating material is applied in a uniform and consistent layer ranging from 0.001" to 0.250". The coating material also back fills minor surface imperfections and blemishes on the substrate to achieve a consistent finish across the whole area where coating material is applied. The coating device includes first and second shell portions. The first shell portion has a concave surface surrounding the aperture portion. The concave surface allows for coating material to collect prior to deposition upon the surface of the substrate. The second shell has a substantially flat face and a mirror aperture that aligns with the aperture of the first shell. A groove is formed along the perimeter of the aperture to collect coating material for coating the object as it passes through the apertures of both shells.

19 Claims, 10 Drawing Sheets

U.S. PATENT DOCUMENTS

| | | | | |
|---|---|---|---|---|
| 3,773,545 A | | 11/1973 | Erb | 117/64 R |
| 3,780,154 A | | 12/1973 | Muller et al. | |
| 3,802,386 A | | 4/1974 | Wendlandt et al. | 118/323 |
| 3,808,030 A | | 4/1974 | Bell | 117/64 |
| 3,811,989 A | | 5/1974 | Hearn | 161/5 |
| 3,922,128 A | * | 11/1975 | Solomon | |
| 3,957,942 A | | 5/1976 | Meudec | 264/235 |
| 4,004,774 A | | 1/1977 | Houston | 249/114 |
| 4,100,243 A | | 7/1978 | Wissinger et al. | 264/171 |
| 4,100,325 A | | 7/1978 | Summers et al. | 428/334 |
| 4,181,764 A | | 1/1980 | Totten | 428/155 |
| 4,204,821 A | | 5/1980 | Gauchel et al. | 425/131.1 |
| 4,228,116 A | | 10/1980 | Colombo et al. | 264/119 |
| 4,248,824 A | | 2/1981 | Hattop | 264/171 |
| 4,322,260 A | | 3/1982 | Conlon | 156/244.12 |
| 4,481,701 A | | 11/1984 | Hewitt | 29/416 |
| 4,515,737 A | | 5/1985 | Karino et al. | 264/22 |
| 4,581,807 A | | 4/1986 | Adell | 29/527.4 |
| 4,671,913 A | | 6/1987 | Gen et al. | 264/171 |
| 4,691,838 A | | 9/1987 | Graham et al. | 220/93 |
| 4,798,453 A | | 1/1989 | Tokumaru | 351/41 |
| 4,807,686 A | | 2/1989 | Schnebly et al. | 160/84.1 |
| 4,818,590 A | | 4/1989 | Prince et al. | 428/213 |
| 4,884,612 A | | 12/1989 | Schnebly et al. | 160/84.1 |
| 4,913,760 A | | 4/1990 | Benson et al. | 156/244.11 |
| 4,928,369 A | | 5/1990 | Schnebly et al. | 29/24.5 |
| 4,936,359 A | | 6/1990 | Totten | 144/2 R |
| 4,938,823 A | | 7/1990 | Balazek et al. | 156/166 |
| 4,940,504 A | | 7/1990 | Starnes | 156/500 |
| 4,942,084 A | | 7/1990 | Prince | 428/284 |
| 4,945,969 A | | 8/1990 | Schnebly et al. | 160/84.1 |
| 5,053,176 A | | 10/1991 | Cameron et al. | 264/75 |
| 5,141,041 A | | 8/1992 | Katz et al. | 160/84.1 |
| 5,169,699 A | | 12/1992 | Prince | 428/68 |
| 5,194,209 A | | 3/1993 | Schwaegerle | 264/132 |
| 5,209,282 A | | 5/1993 | Franco et al. | 160/236 |
| 5,215,698 A | | 6/1993 | Altimus | 264/167 |
| 5,318,737 A | | 6/1994 | Trabert et al. | 264/171 |
| 5,326,520 A | | 7/1994 | Franck et al. | 264/171 |
| 5,387,381 A | | 2/1995 | Saloom | 264/75 |
| 5,406,768 A | | 4/1995 | Giuseppe et al. | 52/730.4 |
| 5,415,822 A | | 5/1995 | Cook | 264/171 |
| 5,449,408 A | | 9/1995 | Koaizawa et al. | 118/405 |
| 5,567,505 A | | 10/1996 | Dehennau et al. | 428/188 |
| 5,648,126 A | | 7/1997 | Kameya et al. | 427/536 |
| 5,665,162 A | | 9/1997 | Sasaki et al. | 118/410 |
| 5,672,303 A | | 9/1997 | Metzger et al. | 264/75 |
| 5,680,891 A | | 10/1997 | Prince | 160/84.05 |
| 5,723,199 A | | 3/1998 | Boot | 428/158 |
| 5,733,632 A | | 3/1998 | Marusak | 428/181 |
| 5,738,814 A | | 4/1998 | Kreth et al. | 264/171.26 |
| 5,759,680 A | | 6/1998 | Brooks et al. | 428/326 |
| 5,773,138 A | | 6/1998 | Seethamraju et al. | 428/326 |
| 5,795,641 A | | 8/1998 | Pauley et al. | 428/134 |
| 5,832,979 A | | 11/1998 | Marusak | 160/173 |
| 5,866,054 A | | 2/1999 | Dorchester et al. | 264/75 |
| 5,897,708 A | * | 4/1999 | Hsu | 118/405 |
| D409,869 S | | 5/1999 | Marusak | D6/577 |
| 5,957,183 A | | 9/1999 | Prince | 160/168.1 R |
| 6,054,207 A | | 4/2000 | Finley | 428/317.9 |
| 6,112,800 A | | 9/2000 | Marusak | 160/298 |
| 6,125,906 A | | 10/2000 | Kotin | 160/236 |
| 6,174,569 B1 | | 1/2001 | Blomer et al. | 427/410 |
| 6,197,412 B1 | | 3/2001 | Jambois | 428/297.4 |
| 6,284,046 B1 | | 9/2001 | Orita et al. | 118/405 |

* cited by examiner

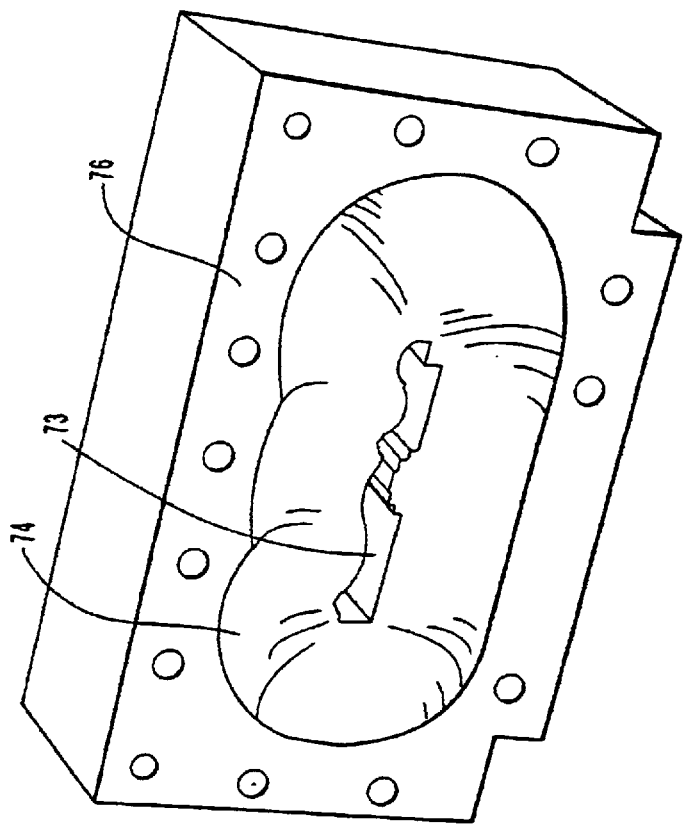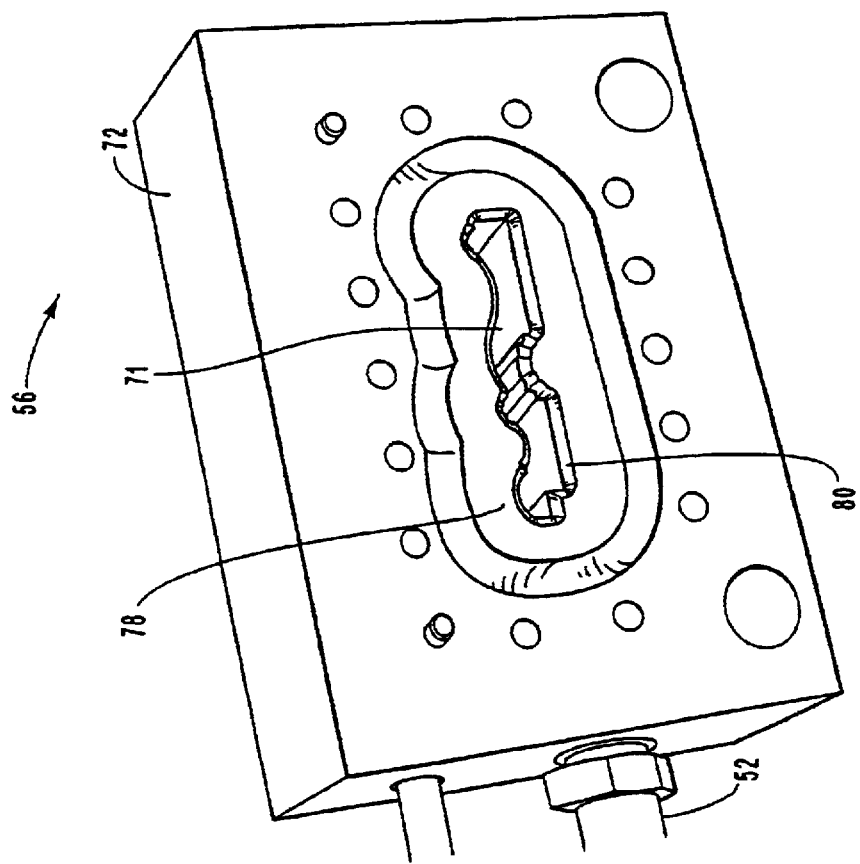
FIG. 4

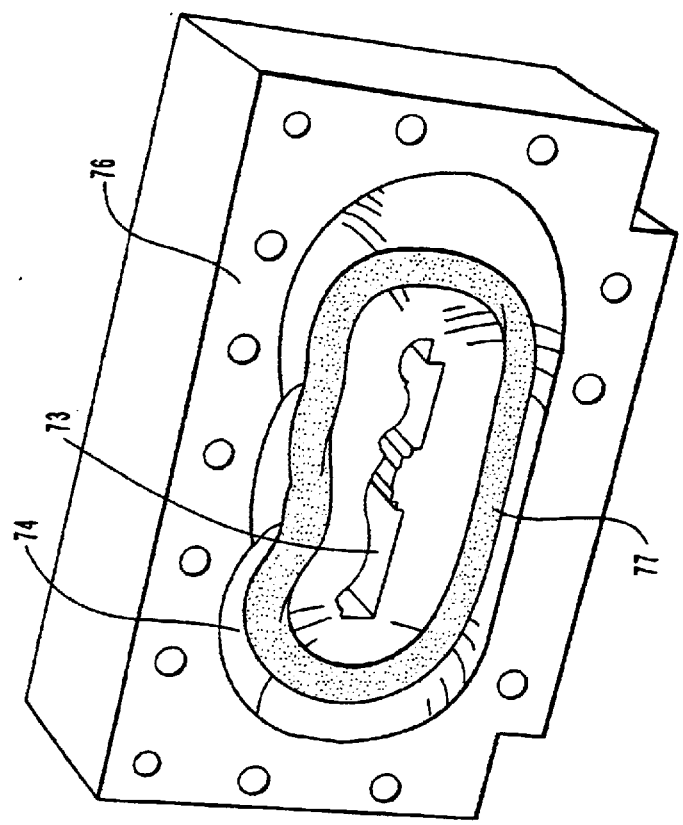
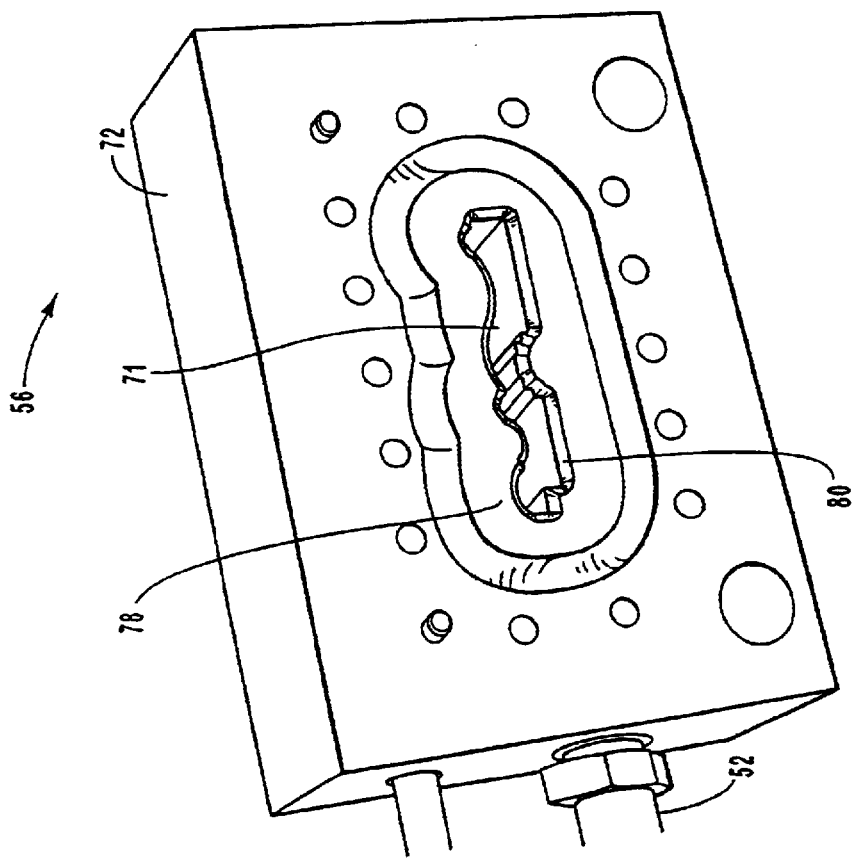
FIG. 9

METHOD AND APPARATUS FOR EXTRUDING A COATING UPON A SUBSTRATE SURFACE

BACKGROUND

The present invention relates generally to coating methods and systems and, more specifically, the present invention relates to a method and system for passing a substrate through a die that applies a coating on the surface of the substrate in a controlled manner.

Applying a coating substance to a substrate is well-known in the art. In applying a coating substance to elements such as wood, plastic, and metal, typically the coating substance is a paint that is applied with a solvent as a carrying agent. This allows the paint to coat the wood, plastic, or metal surface quickly and efficiently. Unfortunately, the solvent must evaporate out of the paint and the paint must dry before the surface can be handled.

An alternative method for applying a coating to a surface includes applying an electrostatic charge to the surface of the substrate, typically a metal, and then oppositely charging the paint so that as it is blown against the surface of the object, the opposite charges attract the paint to the surface. Once the paint powder attaches to the surface via the electrostatic charge, the object is heated in an oven to cure the paint for the final finish. This incurs the steps of cleaning the substrate surface in order for the paint to adhere to all portions of the surface, heating the substrate to a sufficient enough temperature to melt the paint for application, and finally cooling the substrate for handling.

A third method includes running the substrate via a conveyor through a ribbon of coating material to coat the exposed surfaces. The substrate is then inverted to coat the bottom surface as it passes through the curtain of coating material again or in a second stage. In this method, the coating material is a liquid, which typically requires the use of solvents to aid in the deposition of the coating material and the flow of the coating material during the coating step. Moreover, the coating material goes on wet and must dry prior to handling of the substrate or prior to application of any additional coatings that may be desired.

Solvent-based carriers and coating materials incur the added expense of the solvent required to carry the coating material. The drying stages typically require extra time, thus lowering through-put for assembly line finish work. Dry coating and heating of items to cure the paint coating also add to the finish time required, which further reduces throughput.

Accordingly, what is needed is a system and method for applying a coating to a substrate surface that eliminates the use of solvents, electrostatic adhesion, final heating stages, and the like. Further, what is needed is a method and system that provides a uniform and high level of finish on a substrate that allows the coating to dry in the shortest time possible, thus increasing throughput.

SUMMARY OF THE INVENTION

According to the present invention, a coating apparatus and method are disclosed that applies a coating to a product in a uniform and controlled manner. The coating apparatus comprises a feeding stage, an optional pre-treatment stage, at least one coating stage and a finishing stage. The coating stage(s) comprise a coating material feeder and a coating device. The coating device includes an aperture conforming to the perimeter of a substrate to be coated in a first and second dimension. As the substrate passes through the aperture, coating material is applied in a uniform and consistent layer ranging from 0.001" to 0.250" give or take 0.001". The coating material also back fills minor surface imperfections and blemishes on the substrate to achieve a consistent finish across the whole area where coating material is applied. The coating device includes first and second shell portions. The first shell portion has a concave surface surrounding the aperture portion. The concave surface allows for coating material to collect prior to deposition upon the surface of the substrate. The second shell has a substantially flat face and a mirror aperture that aligns with the aperture of the first shell. Along the perimeter of the aperture in the second shell is formed a groove, in which coating material collects in preparation of coating the object as it passes through the apertures of both shells.

Alternatively, the groove can include a bladder or balloon like applicator that is supple and pliant enough to conform to the surface of the object when the surface lacks a uniform perimeter across its entire length. This allows for a three dimensional application of-the coating material over an uneven surface. Additional coating stages are included in alternative embodiments as well as finishing, drying, cooling, and other processing stages desired.

The application of the coating material is useful in finishing the exterior surfaces of base and crown moldings and trim finish in home and office construction. The coating apparatus can also be utilized in coating and finishing the surfaces of picture frames, "wood" shutters and blinds, metal railings and trim.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which:

FIG. 4 illustrates an interior view of the coating faces of the coating devices of FIG. 3;

FIG. 9 illustrates the use of a pliant bladder or balloon to coat non-uniform surfaces of a product in accordance with the present invention;

DESCRIPTION OF THE PREFERRED EMBODIMENTS

Figure 1:
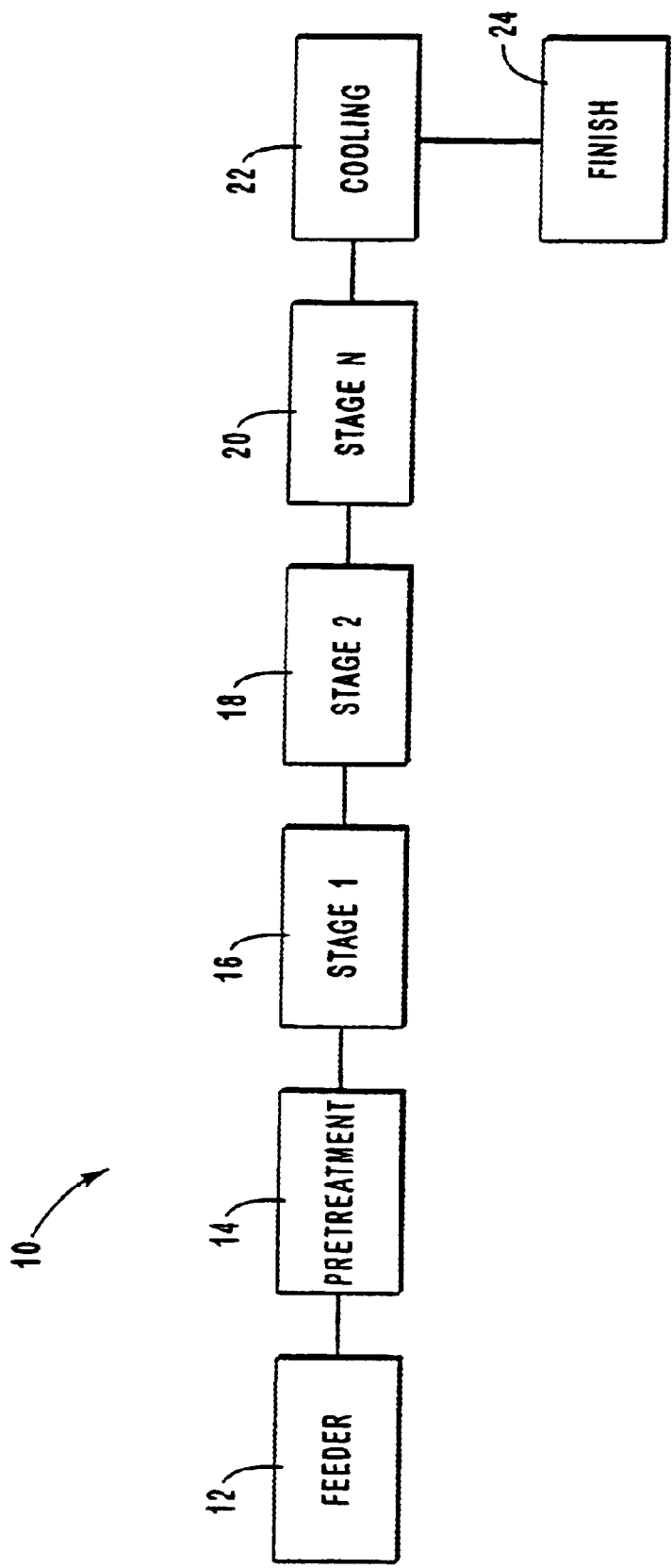
FIG. 1 is a block diagram illustrating various stages found within a coating apparatus in accordance with the present invention.

FIG. 1 illustrates a schematic diagram of a coating and finishing apparatus 10 in accordance with the present invention. Coating and finishing apparatus 10 includes several stages that perform preparation and cleaning of a substrate surface, as well as the application of a coating to the substrate surface. Apparatus 10 can include additional stages to perform a second coating or more of the same material on the substrate, or different coatings of different coating materials on the same substrate until a finished or desired result is achieved. Apparatus 10 also includes additional stages to handle the substrate after coating such as final inspection, packing, or a temporary transition for the purpose of performing additional finishing stages to the product.

Apparatus 10 includes a feeding stage or feeder 12 that handles blank samples prior to pretreatment and coating application performed in the later stages of apparatus 10. Apparatus 10 typically operates in conveyor form to process a plurality of substrate samples in a given hour. The rate of which the number of elements can pass through apparatus 10 is dependent upon the complexity of the treatment of the blanks prior to coating, the number of coats to be applied to the substrate after pretreatment, whether any cooling is necessary between coating stages, and what type of finishing operations are performed at the end. Feeder 12 can handle long lengths of stock in blank form and cut them to desired profiles prior to the pretreatment or additional coating stages later performed along apparatus 10. Further, manageable lengths stock may be fed via feeder 12 and then cut to finish size after the pretreatment and application of the coatings has been completed during the various stages along apparatus 10. Further still, the actual cutting of the stock to the desired lengths may be performed at any stage during the treatment of the stock whether its between a first or second coating stage or any other coating stage along apparatus 10. It is left to the skilled artisan to determine at what stage the stock should be cut to size, if necessary, prior to a particular coating operation step or finishing stage.

Alternatively, although the feeder stage shown in this example operates before the coating stage, it is possible to draw the substrate through the coating stage. Thus, it is contemplated that once the substrate is fed into the coating stage and passes at least a portion there through, the exit end of the substrate may be grasped to draw the substrate through the coating stage. The feeding stage can be placed any where along the line of production which provides the greatest efficiency.

Next, the stock is fed through pretreatment stage 14. Pretreatment stage 14 actually can comprise several stages that are typically performed prior to coating the stock material. For example, pretreatment stage 14 can include apparatus that takes a blank stock and forms it into a desired shape, such as, for example, taking a wood, plastic or metal sample and milling it to a desired profile prior to the coating stages. Additionally, it is useful to clean the surface of the stock material prior to coating so that the coating material will adhere completely and without blemish upon the surface of the stock material. Furthermore, a preheating device can be included to heat at least the surface of the sample to match the temperature of the coating material and enhance the finish of the coating material as it cools. Thus, pretreatment stage 14 can also include cleaning stages that aid in clearing the surface of the stock material passing through apparatus 10. The cleaning stages can include high pressure steam cleaning, high pressure air cleaning, solvent cleaning application, water bath cleaning, or other types of cleaning stages typically appropriate for the type of stock passing through apparatus 10. Since the type of stock passing through apparatus 10 can include, but is not limited to, wood surfaces, wood hybrid products, plastics, metals, fiberglass, and the like, an appropriate cleaning stage would then be applicable.

Once the stock material is treated for application of a coating, the stock material passes from pretreatment stage 14 to a first coating stage 16. In many applications, a single coating stage 16 is all that would be required for applying a single coating of primer, paint, protectorant, or finish coat on the surface of the substrate passing through apparatus 10. In other applications, repeated coatings of the same material, or different coatings of different finishes may be accomplished via the remaining stages 2 through N shown as second stage 18 through N stage 20.

One or each stage 16–20 may include a heating element to heat the surface of the sample passing through just prior to the application of the coating material so the coating material does not cool too rapidly upon contact with the surface. This leads to a higher quality in the finish result. Further, graduated cooling stations may also be included after the coating is applied to prevent the coating from cooling too rapidly for delicate coating materials that require slower cool down times. In alternative stations, where the coating material is insensitive to cooling conditions, a rapid cooling station may be added for greater through put.

Figure 2:
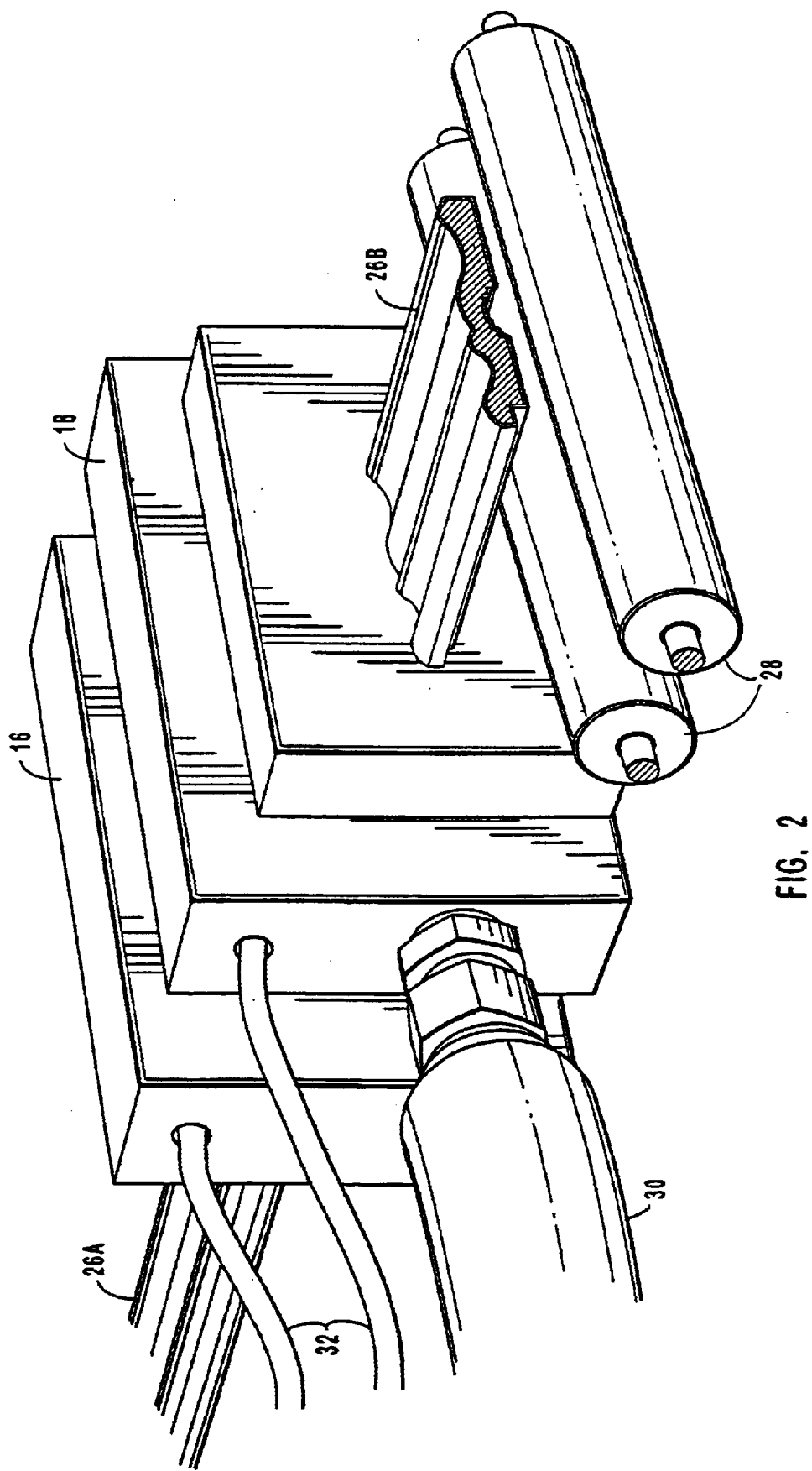
FIG. 2 illustrates a product passing through a coating device of FIG. 1 showing a non-coated stage and a coated stage.

First stage 16 applies a first coat on the substrate surface passing through apparatus 10. In cases where there are slight blemishes and imperfections on the surface of the substrate, the thickness and uniformity of the coating being applied to the surface serves to fill in these imperfections and blemishes completely resulting in a uniform finish over the entire surface of the substrate. FIG. 2 illustrates the surface of a substrate 26 material prior to (26A) and just after (26B) passing through first stage 16. The portion prior to passing through first stage 16, substrate 26a, shows a plurality of blemishes and pock marks on the surface. Once the substrate passes through first stage 16, the pock marks and blemishes are filled in by the coating material so as to achieve a uniform finish across the entire surface of the coated substrate as embodied in substrate 26b.

In the example shown in FIG. 2, substrate 26 actually passes through two stages, first stage 16 and second stage 18. First stage 16 applies a first coat of material to the surface of the substrate while second stage 18 applies a second coat before the substrate exits and is supported by rollers 28. Rollers 28 also serve to transport substrate 26 from one stage to the next and are included where needed between stages or after final finish. Each roller 28 may be coated with a non-stick, non-mar material, such as TEFLON, to prevent the substrate to stick to it while the coating material is cooling or hardening.

Each stage 16 and 18 includes a coating material feeder 30, which feeds fluid coating material for application to the substrate surfaces. An excess material return may also be provided. Further more, each stage 16 and 18 can include a heating element 32 to help keep the coating material in a fluid state to allow it to coat the substrate during operation.

In some applications, first stage 16 merely applies a primer coat that adheres more readily to the surface of the desired substrate than the subsequent coat(s), typically the color coat or finishing coats applied to the substrate. The thickness of the material applied to the surface of the substrate can be as thin as 0.001" to a thickness of 0.250"±0.001". If only a primer coat is applied to the substrate, then the substrate passes from the first stage to the second stage 18.

Second stage 18 either duplicates the steps performed at first stage 16 or applies a second and completely different type of coating material than that applied in first stage 16. If a primer coat is applied during first stage 16, then a secondary coat or even a finish coat may be applied during second stage 18. The coating material used in second stage 18 typically adheres better to the primer applied in first stage 16 than it would directly to the surface of the substrate. When the substrate passes from first stage 16 to second stage 18, the coating material typically is applied in a thin enough and controlled manner so that the coating material dries nearly instantaneously upon exiting one of the stages. This allows the second coating stage to be performed without requiring a cooling or drying step. On those occasions where the coating material is applied rather thickly and a cooling stage is necessary, such can be implemented between stages so that the substrate is dry enough to accept the coating applied in the next stage down stream from the previous stage. Further, the coatings are being applied without the use of solvents or carriers, which typically require additional drying time, thus saving time of application and increasing throughput of stock or substrate materials.

Once the substrate has passed through the second stage 18, and there are additional coatings yet to be applied to the substrate, the substrate will then pass through the appropriate additional stages up to the Nth stage 20 until a desired result is achieved. Further, should the last stage 20 apply a coating that requires cooling, the substrate material passes through cooling stage 22. The cooling stage is utilized at times because the coating material typically is heated well above ambient temperature so that the coating material will flow in fluid or liquid form. The cooling stage cools and dries the coating material to a desired hardness. Such cooling stages can typically include fans circulating forced air to cool the coating material or the coating material may be quenched in a water or other liquid bath appropriate for the coating material as desired.

Lastly, the substrate passes to the finishing stage 24. Finishing stage 24 can include various operations to be performed on the finished substrate at this time. These operations can include merely stacking the substrate, cutting the substrate into desired lengths and then stacking the substrate, or simply feeding the substrate to a human operator for manual stacking as desired. The finishing stage can also include a final inspection to confirm that the finish is acceptable. Additional finishing stages will be readily apparent to those skilled in the art.

Figure 3:
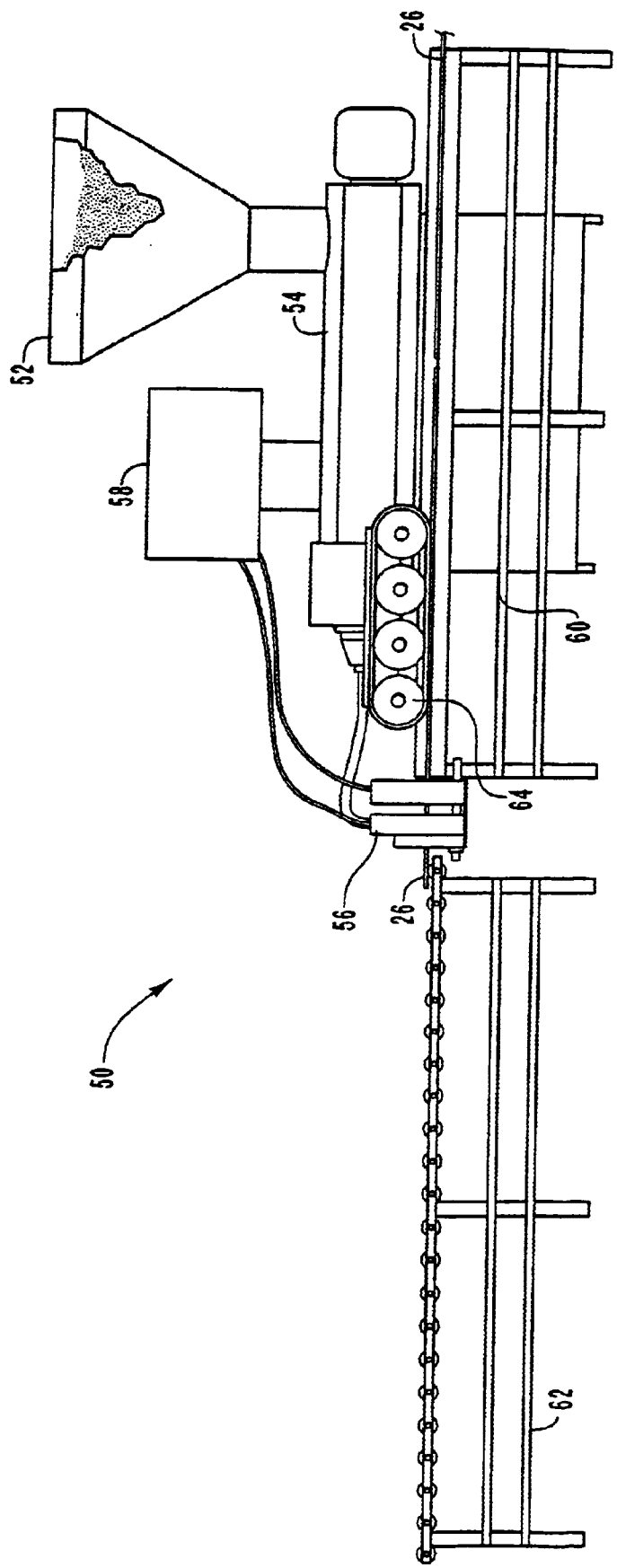
FIG. 3 illustrates the coating device shown in part in FIG. 2 in accordance with the present invention.

A coating apparatus 50, such as that of FIG. 1 that uses first stage 16, second stage 18, or any of N stage 20, is illustrated in greater detail in FIG. 3. Coating apparatus 50 includes a coating material chamber 52, a coating extruder 54, and a coating die 56. Coating chamber 52 attaches to coating die 56 so that the coating material may travel from the chamber to die 56 for application to the substrate as the substrate passes through die 56. A heater 58 connects to chamber 52 and to extruder 54 to heat the coating material to a fluid state. The coating apparatus 50 further includes a feeder assembly tray 60 and an exit roller stand 62, which comprises 28 of FIG. 2. The feeder assembly tray 60 feeds stock to be processed and coated during operation. Exit roller stand 62 receives stock 26 after passing through stage 56. Feeder assembly tray 60 further includes a stock delivery system 64, which can be a belt loop pressed against the substrate 26 to control the delivery rate of the substrate through stage 56.

Die 56 further includes an aperture that has a two dimensional profile matching that of the substrate. Since the die typically is made from a metal or other hard and durable substance for repeated and long term use, the dimensions of the aperture are fixed. The dimensions of the substrate are then adjusted to account for the coating finish to be applied during this stage. The initial dimensions of the substrate are set as the substrate passes through the pretreatment stage 14. The milling operation typically sets the initial dimensions of the substrate prior to passing the substrate to the various coating stages downstream in apparatus 10.

Coating material chamber 52 holds a given quantity of coating material. The coating material typically is a dry material in pellet form such as, but not limited to, acrylics, polyesters, polypropylenes, polyethylene, polyvinylchlorides (PVC), polyolefins, ABS, or as ASA. The coating material can comprise an alloy of any of the previously listed materials involving two or more elements. The material can be in powder or liquid form as well and is not limited to pellet form. Pellet form is used because of its ease of handling over liquid or powder forms. Additional materials are included in the coating "recipe" such as color pigment, UV stabilizers, emulsifiers, rubbers, and other types of stabilizers necessary to ensure a durable and appealing finish to the coating applied to the substrate. The bulk carrying material, which primarily functions as a binder to the substrate, is selected from, but not limited to, acrylics, polyesters, etc. and typically comprise between 70 to 80 percent of the coating material. The pigmentation typically includes about 10 percent of the coating material. The remaining 10 to 20 percent of the coating material incorporates the UV stabilizers, emulsifiers, and other elements previously mentioned.

The material placed within chamber 52 is heated by heater 58 to a liquified or fluid temperature state that allows the mixture to flow either via a pump or gravity fed via extruder 54. As the coating material now is in a liquid or fluid state, it travels to the cavity formed within coating device 56 until it surrounds the perimeter of the aperture in the coating die. Once a sufficient amount of coating material collects within the cavity and along the perimeter of the aperture, the coating material is ready to be applied to the substrate as the substrate passes through die 56.

The substrate then passes through die 56 in conformance to the profile matching the die. As the substrate passes through the die profile, the coating material is applied directly to the surface of the substrate in a controlled manner or within the tolerances allowed by the die relative to the substrate surface. The physical action of the coating material application can be either hydrostatic coating or constriction as the substrate passes through the die where the coating material perimeter is smaller than that of the substrate perimeter, thus forcing the substrate perimeter to contact the smaller perimeter formed by the coating material within die 56. The coating material is applied in very fine coats, ranging from 0.001" to 0.250"±0.001", thereby accurately controlling the amount and thickness of coating material applied at this time. The ability to control the actual thickness of the coating material eliminates the excess over spray that typically is found in solvent-based spray systems known in the art, as well as the excess application of coating material in a ribbon coating system.

In an alternative embodiment, as shown in FIG. 9, the perimeter of die 56 can include a pliant liner that is able to conform to the substrate surface should the surface of the substrate have a non-uniform profile. This allows apparatus 10 to apply coating material uniformly across a surface in a three dimensional manner. Where the perimeter of die 56 is fixed, the cross sectional perimeter of the substrate must be fixed at all times as it passes through the die. For example, the liner can include a pliable rubber or polyvinyl material that can give to conform to the changing profile of the substrates as it passes through the die. Also, the liner can include a pliant bladder or balloon-like device that has a rather large surface area in comparison to the hard edge of a fixed perimeter application die 56. The bladder or balloon is filled with either air or liquid and causes the exterior surface of the bladder to cover the substrate and coat the surface completely, whether the surface has a uniform or varying profile. The bladder can comprise more than one piece and surround the perimeter of the aperture through which the substrate passes. Further still, the bladder can have a donut or toroid-shape that allows passage of the substrate through the center opening of the toroid.

FIG. 4 illustrates a perspective view of coating die 56 when split open to show the interior construction. Coating die 56 typically comprises two portions a first die shell 70 and a second die shell 72. The first die shell 70 includes a cavity 74 formed within a first face 76 around the perimeter of the aperture 71 through which the substrate passes. Cavity 74 provides a collecting cavity for the coating material as it transports from coating chamber 52 to die 56. Second die shell 72 typically includes a substantially planar face 78, which meets with the cavity 74 and face 76 of die shell 72 in such a relation that the aperture of die 58 matches with a similar, but mirror-shaped aperture 73 found in second die face 78. Along the inner perimeter of the aperture formed in die shell 72, is a receiving channel 80 in which the coating material further collects to allow the substrate to pass through the coating material and apply the coating material to the surface of the substrate during the coating step. Channel 80 may either have an interior radius R, a slant at a given angle, such as 45 degrees or any other desirable angle, or have a substantially square or rectangular shape. The requirement is that the channel formed around the perimeter be sufficient enough for the coating material to collect in sufficient quantity so as to apply a uniform amount of coating material around all the dimensions of the substrate.

Figure 5:
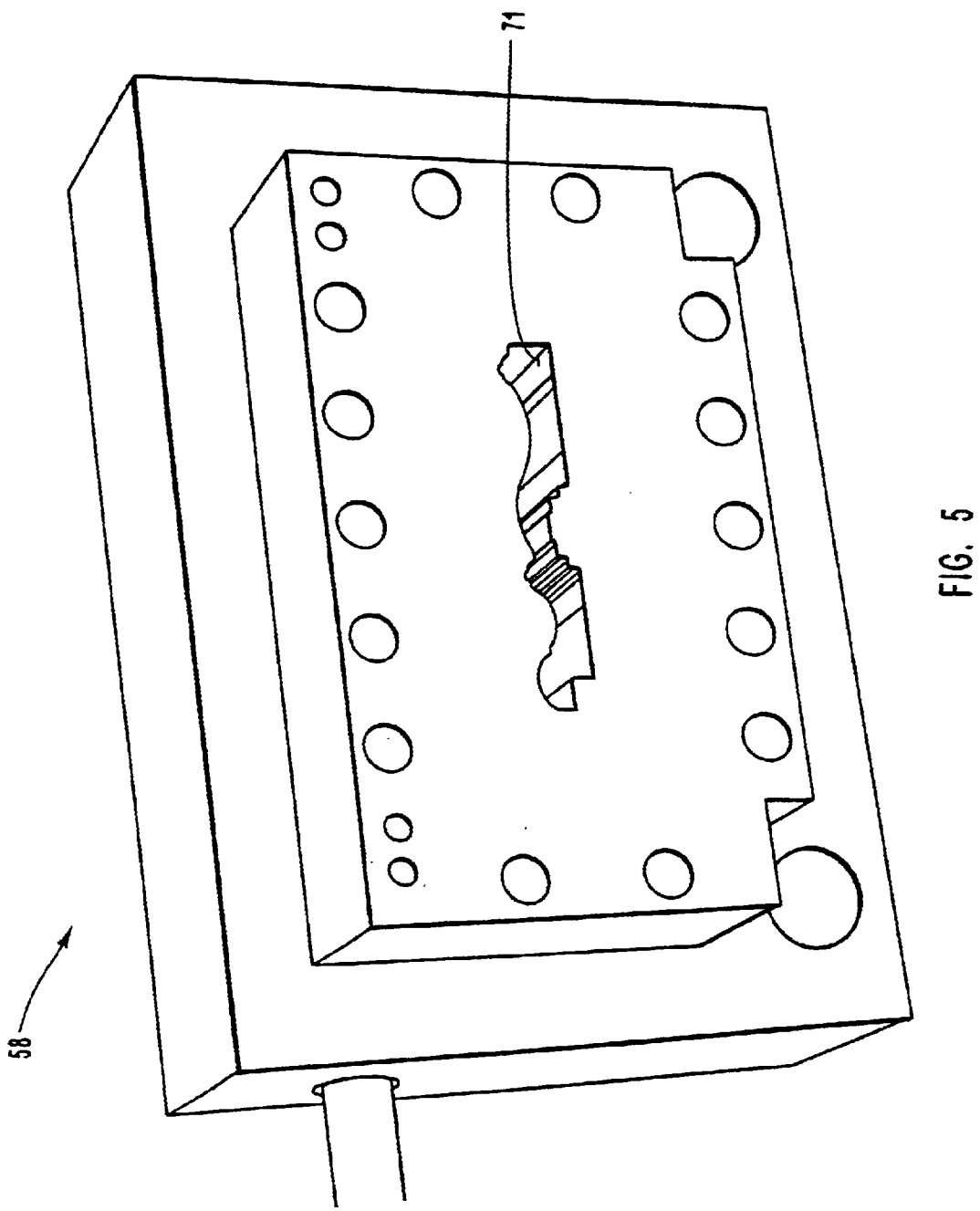
FIG. 5 illustrates a profile formed in the aperture of the coating device in accordance with the present invention.
Figure 6:
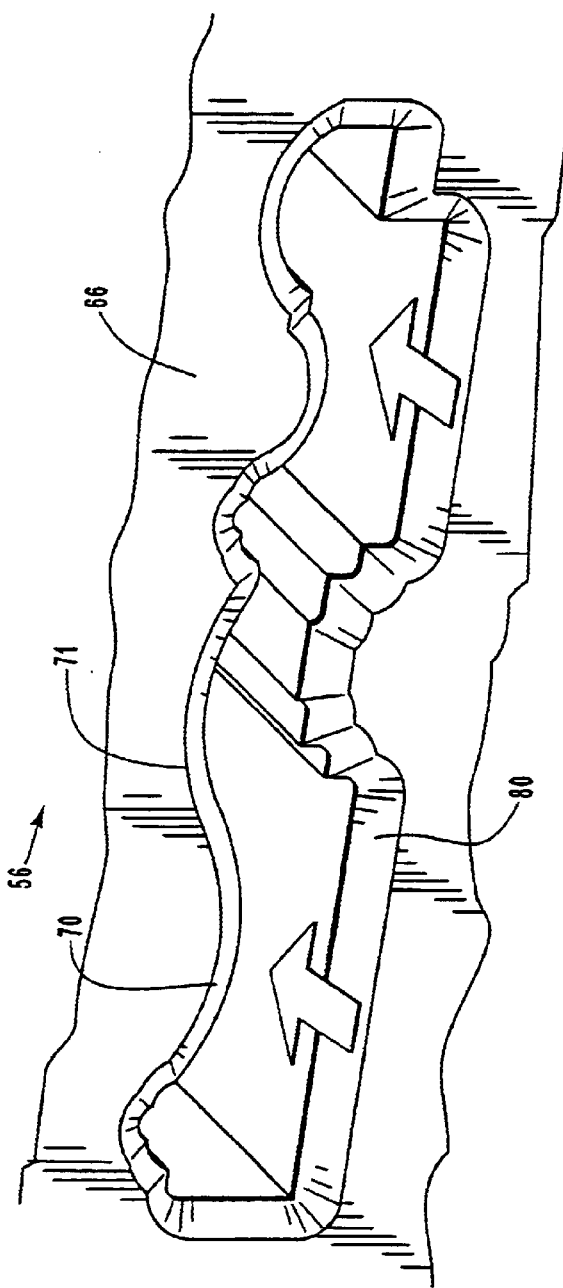
FIG. 6 shows a partial cut-away view of the profile and aperture having a channel about its perimeter for collecting the coating material for application.
Figure 7:
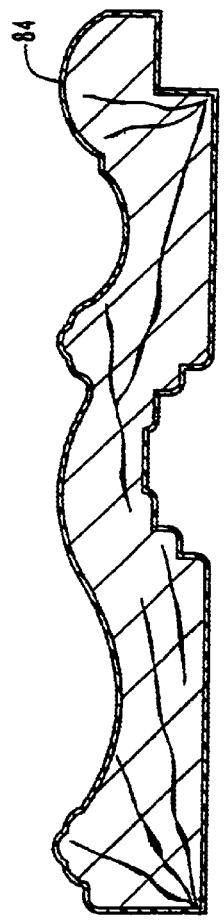
FIG. 7 illustrates a cross-sectional plan view of a substrate having a coating applied and a profile matching that of the aperture of FIG. 6.

FIG. 5 illustrates a perspective view of die 56 where the substrate exits after coating. FIG. 6 illustrates a perspective cut-away view of the opposite, interior side of die 56 where the substrate moves in the direction of the arrows. Notice how the profile of the aperture of die 56 matches that of the substrate 84 shown in cross-sectional form in FIG. 7.

Figure 8C:
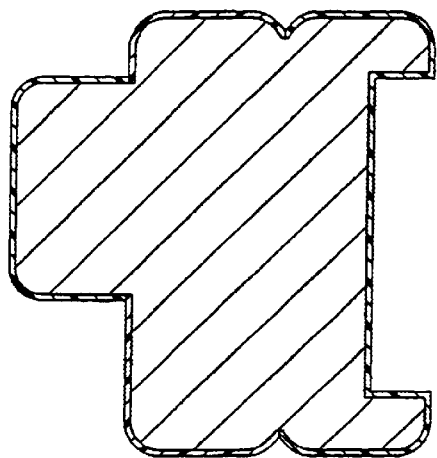
FIGS. 8A–D illustrate a complex profile possible with a defined aperture in the coating device of FIG. 3 in accordance with the present invention as well as the application of one type of coating material to a portion of the substrate or to no portion of the substrate.
Figure 8D:
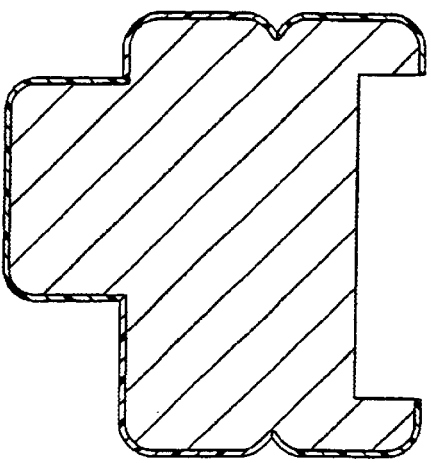
Figure 8A:
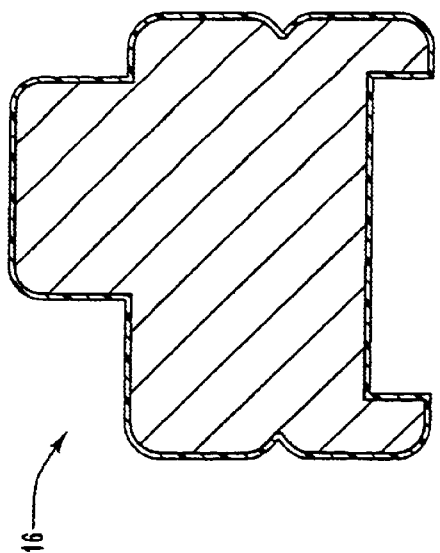
Figure 8B:
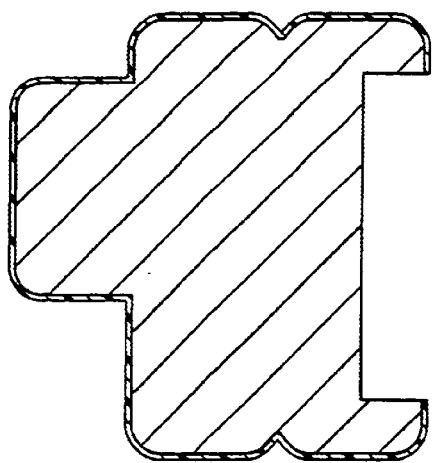

In another alternative embodiment, selected portions of the die aperture may be blocked off. FIG. 8 illustrates various configuration of how the damn may be implemented. In FIG. 8A, the entire outer surface of substrate 86 is coated with a uniform finish. Further, should only 3 sides of a 4-sided perimeter of the substrate be coated, as shown in FIG. 8B, the fourth side can be blocked so that no coating material is applied to that surface. Further, should the user only want paint applied to a single surface, then the remaining sides can be blocked. This is also helpful when more than one color scheme is desired. Accordingly, several stages can be utilized, each stage being blocked so that only a single application in a give location is made, which application does not overlap with the other color application to apply either 2-tone or other multiple-tone color schemes. FIG. 8C illustrates a multi-colored scheme of coating material applied to substrate 86. FIG. 8D shows multiple color coatings on different portions of the substrate as well as bare portions that were blocked during each coating stage.

Further still, a section of the same surface can be blocked so that coating material is applied only to that open surface section. This is also helpful when a multiple color scheme is desired. Moreover, the blocking of certain sections is useful when it is apparent that the portion not being coated is intended to be hidden from view so aesthetically it is not required to actually coat the entire surface. For example, when the substrate is to be used as a base board or crown molding, the back side and non-exposed edges need not be coated. This saves materials and time thereby reducing costs to the producer and the consumer.

Figure 10:
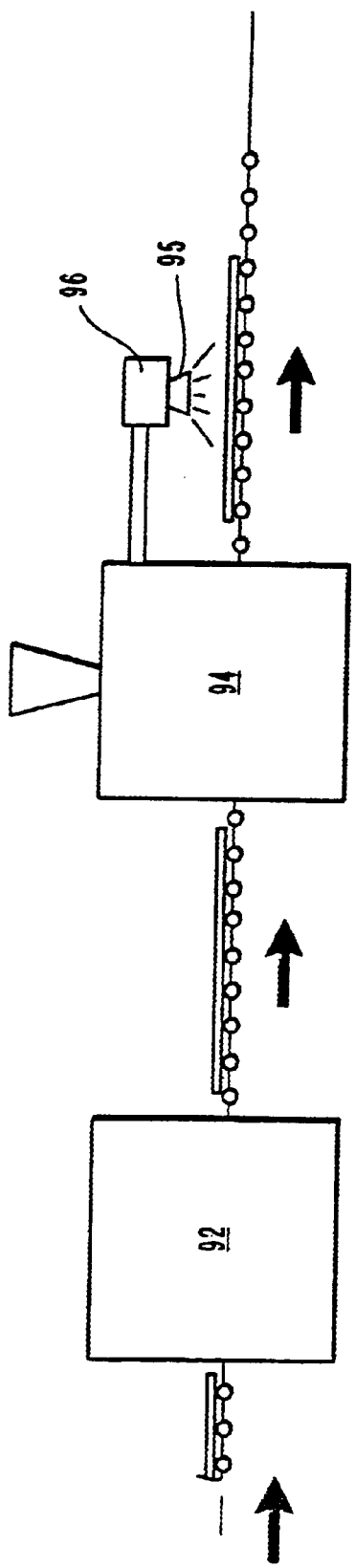
FIG. 10 is a schematic diagram of an alternative coating apparatus in accordance with the present invention.

An alternative coating apparatus embodiment is shown in FIG. 10. Apparatus 90 includes substrate handling stage 92, similar to that of feeder 12 or pretreatment stage 14 of FIG. 1. A coating stage 94 is also included. Coating stage 94 heats the coating material to a fluid and workable state so that the material can be sprayed onto the surface of the substrate by a nozzle 95 as the substrate feeds through apparatus 90. A heating element 96 is also placed in the nozzle as an option. The heating of the nozzle keeps the coating material in a fluid state with less build of residual coating material. Further, heating element 96 can vary its temperature to match the optimal temperature for spraying the coating material onto the substrate before cooling too quickly and resulting in less than optimal finishes. The temperature is dependent on other factors such as ambient temperature, coating material being used, distance set from the substrate to be coated, and thickness of coating to be applied. The spray nozzle can be air driven or airless. The use of heating element allows for the coating material to be delivered sans carrying agent such as lacquer, thinner, or other solvent type coating materials of the prior art. This allows for faster hardening of the coating material and lower costs of material in eliminating difficult solvents or carriers. Additional, a faster hardening time allows for greater throughput.

Figure 11:
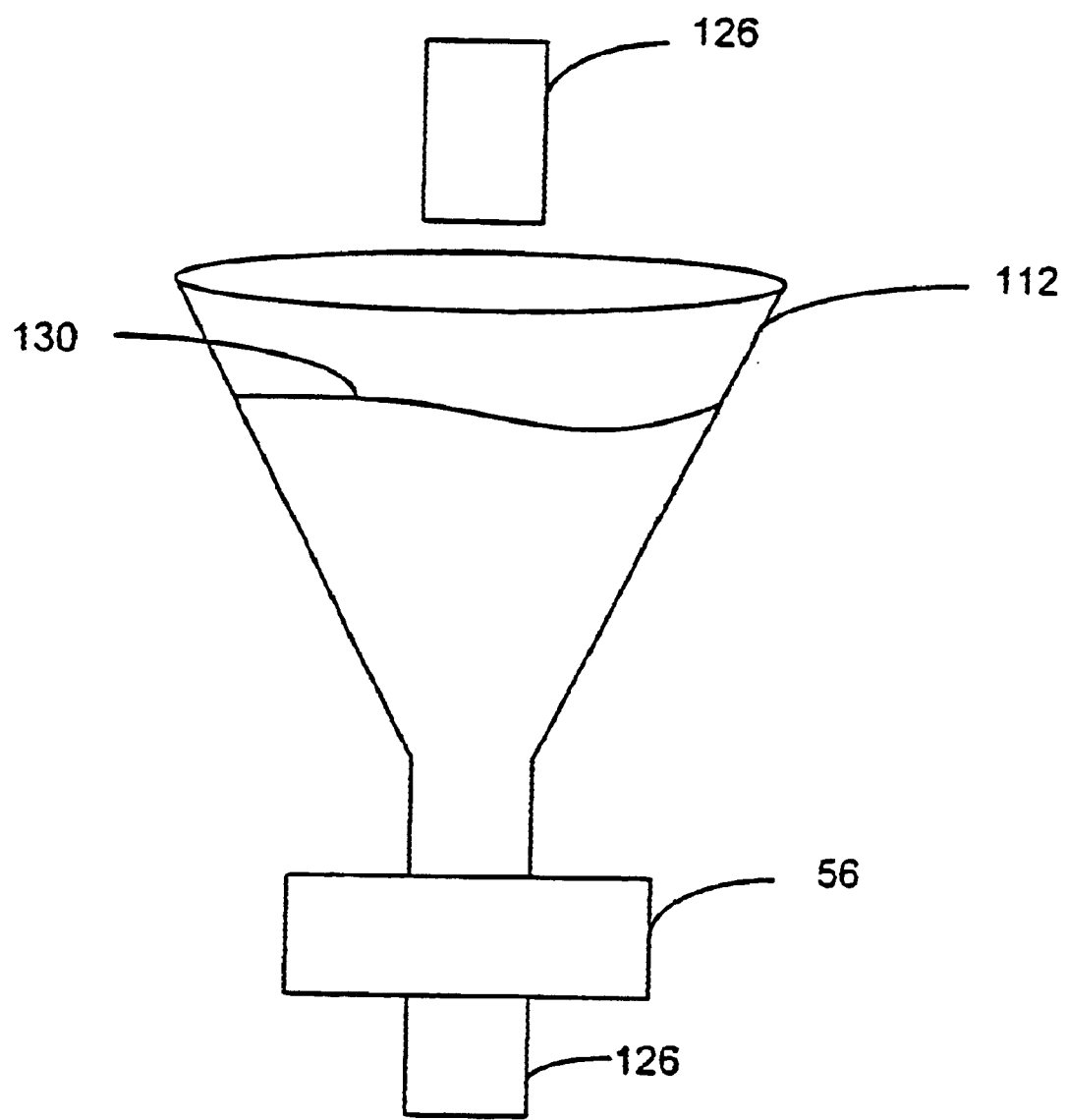
FIG. 11 is a schematic diagram of an alternative coating material delivery system contemplated within the present invention.

Yet another embodiment of the coating apparatus according to the instant invention and shown in FIG. 11 utilizes a gravity fed coating chamber or vat 112 that allows for stock items 126 to be coated to be dropped and drawn through the coating material 130, then finished by passing through the coating die 56 in a substantially vertical direction. The coating material 130 can be maintained viscous enough that the aperture prevents the material from flowing out of the die 56, yet still achieving a quality finish on the product.

The types of product that are finished within coating apparatus 10 include, but are not limited to: Base and crown molding in home and business construction; trim work for interior and exterior applications in home and business; picture frame surface finishing; "wood" blinds and shutters; metal trim and finish work; coating plastic or rubber substrates; coating large planks, such as 4'×8' panels; and vinyl or metal siding.

The substrate or product intended to be coated can be any study object including metal, metal-type objects, wood, wood-based products, medium-density fiberboard (MFB) synthetic substrates such as plastics, glass, glass-based products, and anything else that is substantially rigid so that its shape is maintained as it passes through the die.

The invention may be embodied in other specific forms without departing from its spirit or essential characteristics. For example, although only a single coating apparatus is depicted in the drawings, it would be readily apparent to one skilled in the art that multiple stages could be placed in parallel. The parallel operation of a plurality of coating lines would increase throughput over a single line system. Thus it is contemplated that parallel operating, multiple coating line systems would be implemented based on the coating apparatus disclosed in the instant invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for applying a covering to a surface of an object having one of a uniform or non-uniform profile, comprising:
   a feeding stage that feeds the object to be coated;
   a coating stage, substantially aligned with the feeding stage, to receive the object from the feeding stage, the coating stage comprising:
      a coating feeder;
      an object coating device, coupled to the coating feeder, said object coating device is a coating die comprised of a first shell portion and a second shell portion, each shell portion having an inner face, the inner face is configured and arranged to meet and face each other, said first shell portion having a first aperture and the inner face of said first shell portion includes a concave surface surrounding said first aperture which collects the coating material fed from the coating feeder, said second shell portion having a second aperture which is aligned with said first aperture such that the object being fed through said first aperture and said second aperture is coated, wherein the inner face of said second shell having arranged thereon a fluid filled bladder applicator which surrounds the perimeter of the second aperture and is capable of conforming to the surface of the object so as to enable one to uniformly coat the object regardless of whether the profile of the object is uniform or non-uniform; and
   a receiving stage substantially aligned with the coating stage to receive the object after being coated.

2. The system according to claim 1, further comprising a pretreatment stage, coupled to the feeding stage and the coating stage, to pre-treat the object prior to being coated.

3. The system according to claim 2, wherein the pretreatment stage cleans the object prior to application of the coating material.

4. The system according to claim 2, wherein the pretreatment stage shapes the profile of the object to conform to the first aperture of the object coating device.

5. The system according to claim 1, further comprising a second object coating device, coupled to the object coating device and the receiving stage, to apply a second coating material on the object.

6. The system according to claim 1, further comprising a post treatment stage, coupled to the object coating device and the receiving stage, to treat the object after application of the coating material.

7. The system according to claim 1, wherein the object coating device applies the coating material to the object with a substantially uniform thickness in the range of 0.001" inches to 0.250" inches.

8. The system according to claim 1, wherein the coating material is selected from the group comprising: acrylics, poly-vinyl chlorides (PVC), ABS, polyesters, polyolefins, ASA, and nylons.

9. The system according to claim 1, wherein the coating material comprises a thermal-plastic.

10. The system according to claim 1, wherein the coating material comprises a first portion of binding carrying material and a second portion of a color pigment, wherein the first portion is greater than the second portion.

11. A system for selectively applying a coating to a surface of an object having one of a uniform or non-uniform profile, comprising:
    a feeding stage that feeds the object to be coated;
    a plurality of coating stages, one of the coating stages being substantially aligned with the feeding stage and each of the coating stages being serially coupled to one another, to receive the object from the feeding stage, each coating stage comprising:
       a coating feeder;
       an object coating device, coupled to the coating feeder, said object coating device is a coating die comprised of a first shell portion and second shell portion, each shell portion having an inner face, the inner faces configured and arranged to meet and face each other, said first shell portion having a first aperture and the inner face of said first shell portion includes a concave surface surrounding said first aperture which collects the coating material fed from the coating feeder, said second shell portion having a second aperture which is aligned with said first aperture such that the object being fed through said first aperture and said second aperture of the die is coated, wherein the inner face of said second shell portion includes a fluid filled bladder applicator which surrounds the perimeter of the second aperture and is capable of conforming to the surface of the object so as to enable one to uniformly coat the object regardless of whether the profile of the object is uniform or non-uniform, wherein each successive object coating stage has a first and second aperture larger than the second aperture of the preceding object coating stage; and
    a receiving stage, substantially aligned with one of the plurality of coating stages, to receive the object after being coated.

12. The system according to claim 11, further comprising a pretreatment stage, coupled to the feeding stage and one of the plurality of coating stages, to pretreat the object prior to being coated.

13. The system according to claim 12, wherein the pretreatment stage cleans the object prior to application of the coating material.

14. The system according to claim 12, wherein the pretreatment stage shapes the profile of the object to conform to the first aperture of the first of the plurality of object coating devices.

15. The system according to claim 12, wherein the coating material utilized in one of the plurality of the object coating devices comprises a first portion of binding carrying material and a second portion of a color pigment, wherein the first portion is greater than the second portion.

16. The system according to claim 11, further comprising a post treatment stage, coupled to one of the plurality of object coating devices and the receiving stage, to treat the object after application of the coating material.

17. The system according to claim 11, wherein the object coating device applies the coating material to the object with a substantially uniform thickness in the range of 0.001" inches to 0.250" inches.

18. The system according to claim 11, wherein the coating material is selected from the group comprising: acrylics, poly-vinyl chlorides (PVC), ABS, polyesters, polyolefins, ASA, and nylons.

19. The system according to claim 11, wherein the coating material utilized in one of the plurality of object coating devices comprises a thermal-plastic.

* * * * *